US006969840B1

(12) United States Patent
Theriault et al.

(10) Patent No.: US 6,969,840 B1
(45) Date of Patent: Nov. 29, 2005

(54) IMAGING OPTICAL SYSTEM INCLUDING A TELESCOPE AND AN UNCOOLED WARM-STOP STRUCTURE

(75) Inventors: P. Chris Theriault, Tucson, AZ (US); Rudolph E. Radau, Jr., Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/909,620

(22) Filed: Aug. 2, 2004

(51) Int. Cl.[7] .......................... H01J 3/14; G02B 17/00; G02B 5/10
(52) U.S. Cl. ...................... 250/216; 250/352; 359/366; 359/859; 359/729
(58) Field of Search ................................ 250/216, 238, 250/239, 352, 353; 359/364–366, 358, 359, 359/726–732, 856–861, 868, 869

(56) References Cited

U.S. PATENT DOCUMENTS

| 4,226,501 A | 10/1980 | Shafer |
| 4,804,258 A | 2/1989 | Kebo |
| 4,820,923 A | 4/1989 | Wellman |
| 4,972,085 A | 11/1990 | Weber et al. |
| 4,990,782 A | 2/1991 | Wellman et al. |
| 5,093,837 A | 3/1992 | Edwards |
| 5,225,931 A | 7/1993 | Stavroudis |
| 5,444,250 A | 8/1995 | Hanke |
| 5,640,283 A | 6/1997 | Warren |
| 6,356,388 B1 * | 3/2002 | Geyl .......................... 359/366 |
| 6,596,997 B2 | 7/2003 | Kaufman |

* cited by examiner

*Primary Examiner*—Kevin Pyo
(74) *Attorney, Agent, or Firm*—Thomas J. Finn; Leonard A. Alkov; Karl A. Vick

(57) ABSTRACT

An all-reflective telescope has, in order, a positive-optical-power primary mirror, a negative-optical-power secondary mirror, a positive-optical-power tertiary mirror, a negative-optical-power quaternary mirror, and a positive-optical-power field lens. The mirrors and lens are axisymmetric about a beam axis. The light beam is incident upon an infrared detector after reflecting from the quaternary mirror. A cooling housing encloses the detector and the field lens, but does not enclose any of the mirrors. An uncooled warm-stop structure outside of the cooling housing but in a field of view of the detector is formed as a plurality of facets with reflective surfaces oriented to reflect a view of an interior of the cooling housing back to the interior of the cooling housing.

12 Claims, 4 Drawing Sheets

| COMPONENT (ITEM #) | RADIUS-OF-CURVATURE (INCH) | THICKNESS (INCH) | CONIC CONSTANT | DIAMETER (OUTER/INNER) (INCH) | MATERIAL |
|---|---|---|---|---|---|
| PRIMARY MIRROR (24) | -10.80000 | -3.662676 | -1.000000 | 9.000 / 3.400 | MIRROR |
| SECONDARY MIRROR (32) | -10.84635 | 2.556209 | -27.490053 | 3.400 / 0.000 | MIRROR |
| FIELD STOP (38) | NA | 4.387004 | NA | 0.222 / 0.000 | AIR |
| TERTIARY MIRROR (34) | -5.77249 | -4.387004 | -0.103931 | 2.540 / 1.500 | MIRROR |
| QUATERNARY MIRROR (36) | -17.58714 | 4.387004 | -12.39507 | 2.500 / 0.222 | MIRROR |
| TERTIARY MIRROR OPENING (40) | NA | 2.750000 | NA | 1.500 / 0.000 | AIR |
| FIELD LENS (37) S1 | 0.8640814 | 0.0750000 | 0.6157962 | 0.750 / 0.000 | GERMANIUM |
| FIELD LENS (37) S2 | 1.12964 | 0.2317862 | 0.000000 | 0.680 / 0.000 | |
| FOCAL PLANE | INFINITE | NA | NA | | NA |

FIG. 3

IMAGING OPTICAL SYSTEM INCLUDING A TELESCOPE AND AN UNCOOLED WARM-STOP STRUCTURE

This invention relates to imaging optical systems and, more particularly, to a telescope optimized for use with an infrared detector.

BACKGROUND OF THE INVENTION

In one type of imaging optical system using a sensor, an infrared detector is placed into a cooling housing. The cooling housing maintains the detector at the required cryogenic temperature for efficient operation of the detector. The housing has an aperture therethrough so that the infrared detector may view an external scene through the aperture. In most cases, there is an optics subsystem that images the external scene onto the detector. The optics subsystem may be a telescope that alters the magnification of the scene when it is imaged onto the detector. For many applications, the optics subsystem must be as compact as possible, while remaining consist with the required optical performance.

In addition to the scene, some of the structure of the imaging optical system is within the field of view of the detector. The perceived temperature of the viewed structure is highly significant to the quality of the image produced by the infrared detector, because infrared wavelengths are associated with heat. The viewed portion of the structure that is cooled, such as the aperture of the cooling housing, does not adversely affect the image produced by the infrared detector. However, the viewed portion that is not cooled, such as the support structure of the optics subsystem, affects the viewed image as a form of noise.

One solution to this potential problem is to extend the cooling housing to include at least some of the portions of the structure that are within the field of view of the infrared detector. This solution greatly increases the volume that must be cooled, and reduces the rate at which the housing and its contents may be cooled from room temperature. This cooldown rate is a significant consideration for many applications, where the detector is initially at room temperature and must be rapidly cooled to the required cryogenic service temperature of the detector before operations may commence. Another approach is to use an off-axis optics subsystem. In this case, the optical elements, such as lenses and/or mirrors, must be highly powered and non-rotationally symmetric, with the result that they are difficult and expensive to manufacture, align, and test, and also require heavy supporting structure. The size and mass of the imaging optical system are also increased.

There is a need for an improved approach to such an imaging optical system. The present invention fulfills this need, and further provides related advantages.

SUMMARY OF THE INVENTION

The present approach provides an imaging optical system that is particularly useful for an infrared sensor system wherein the infrared detector must be rapidly cooled from room temperature to cryogenic temperature prior to commencing operation. The amount of the imaging optical system that must be cooled is held at a minimum, facilitating the rapid cooldown, while avoiding adverse effects of warm structure in the field of view of the infrared detector. The axially symmetric optics subsystem is not cooled, except for one small cooled lens. The size and mass of the imaging optical system are thereby held to a small size.

In accordance with the invention, an imaging optical system comprises a telescope having a positive-optical-power primary mirror that receives a light beam from an external source parallel to a beam axis, a negative-optical-power secondary mirror that receives the light beam reflected from the primary mirror, a positive-optical-power tertiary mirror that receives the light beam reflected from the secondary mirror, a negative-optical-power quaternary mirror that receives the light beam reflected from the tertiary mirror, and a positive-optical-power field lens that receives the light beam reflected from the quaternary mirror. The light beam reflected from the secondary mirror passes through a quaternary-mirror central opening in the quaternary mirror and through a primary-mirror central opening in the primary mirror, and the light beam reflected from the quaternary mirror passes through a tertiary-mirror central opening in the tertiary mirror.

Preferably, the primary mirror, the secondary mirror, the tertiary mirror, the quaternary mirror, and the field lens are all axisymmetric about the beam axis. It is also preferred that the sum of the optical powers of the primary mirror, the secondary mirror, the tertiary mirror, and the quaternary mirror and field lens is substantially zero.

The imaging optical system also typically includes a detector, preferably an infrared detector, upon which the light beam is imaged after the light beam passes through the tertiary-mirror central opening and through the field lens. The infrared detector is enclosed in a cooling housing that encloses the detector but does not enclose any of the primary mirror, the secondary mirror, the tertiary mirror, and the quaternary mirror. The field lens, which is of a relatively small size and mass, is preferably located within the cooling housing.

There is desirably an uncooled warm-stop structure outside of the cooling housing but in a field of view of the detector. The warm-stop structure comprises a plurality of facets with reflective surfaces oriented to reflect a view of an interior of the cooling housing back to the interior of the cooling housing, and specifically to the detector. The warm-stop structure is positioned to extend between the tertiary mirror and the quaternary mirror. The termination of the warm-stop structure in the vicinity of the quaternary mirror defines the system (pupil) stop. In the preferred design, the warm-stop structure has an external generally frustoconical form, with a larger end at the tertiary mirror and a smaller end at the quaternary mirror. The warm-stop structure also has an internal generally frustoconical faceted form, with a larger end at the tertiary mirror and a smaller end at the quaternary mirror. The quaternary-mirror central opening in the quaternary mirror serves as the intermediate field stop.

In another embodiment, an imaging optical system comprises an infrared detector upon which a light beam is incident, a set of optical elements that together direct the light beam to be incident upon the infrared detector, and a cooling housing enclosing the detector. An uncooled frustoconical warm-stop structure is outside of the cooling housing but in a field of view of the detector. The warm-stop structure comprises a plurality of facets with reflective surfaces oriented to reflect a view of an interior of the cooling housing back to the interior of the cooling housing and preferably to the detector. Operable features used in conjunction with other embodiments may be used with this embodiment.

The axisymmetric optical design of the optical system greatly facilitates the assembly and testing of the optical system. The large parabolic primary mirror and the primary-secondary mirror combination may be readily tested during fabrication and assembly using null testing, facilitating the manufacturing process. The present approach provides an infrared imaging optical system that has a minimal cooled volume. Specifically, only the infrared detector and the field lens must be cooled by its cooling housing, and the other elements, including both the reflective optical elements and the uncooled warm-stop structure, are outside of the volume of the cooling housing. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIG. 3 is an optical prescription of an embodiment of the imaging optical system of FIG. 1.

DETAILED DESCRIPTION OF THE INVENTION

Figure 1:
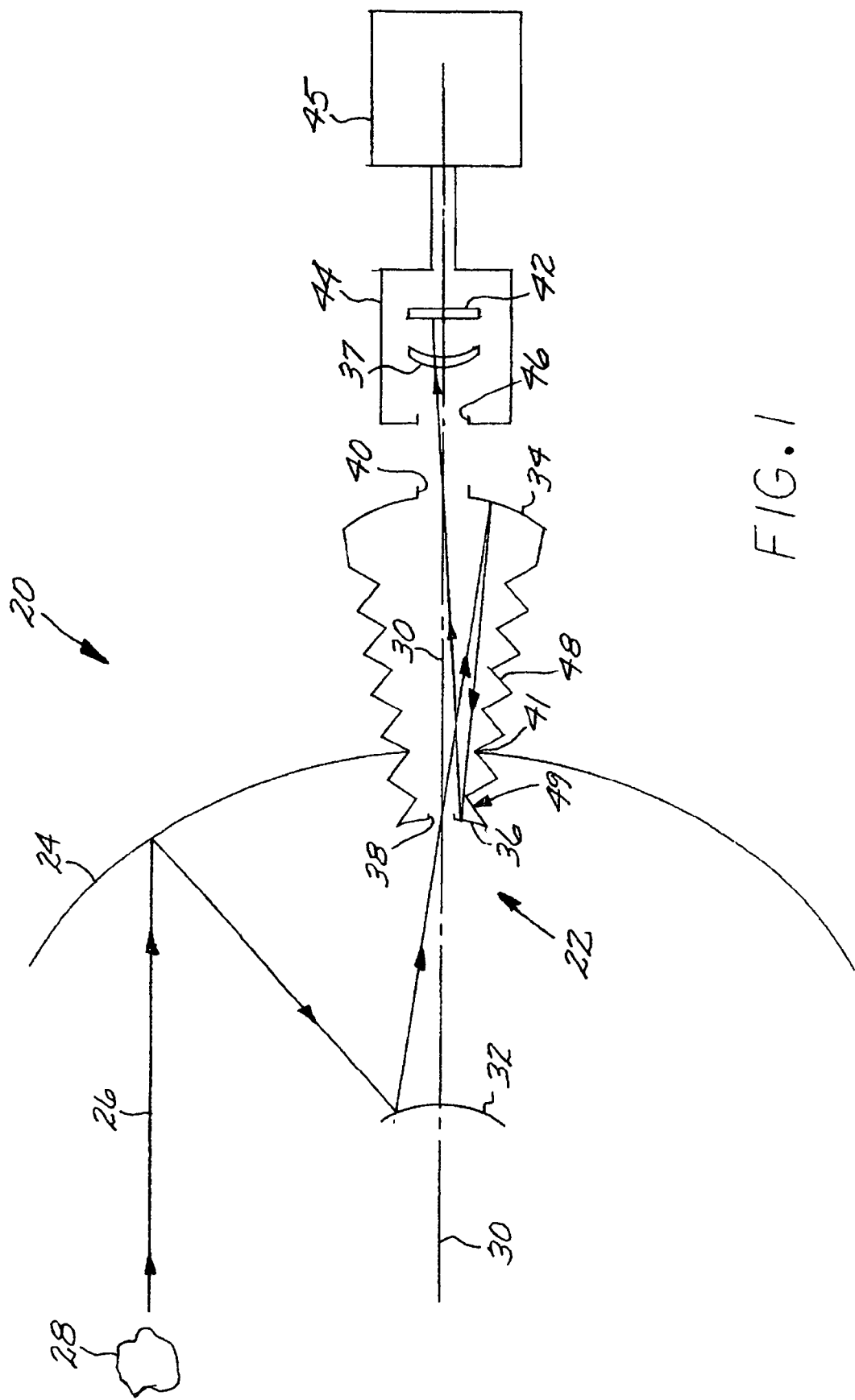
FIG. 1 is a schematic view of an embodiment of an imaging optical system in accordance with the invention.
Figure 2:
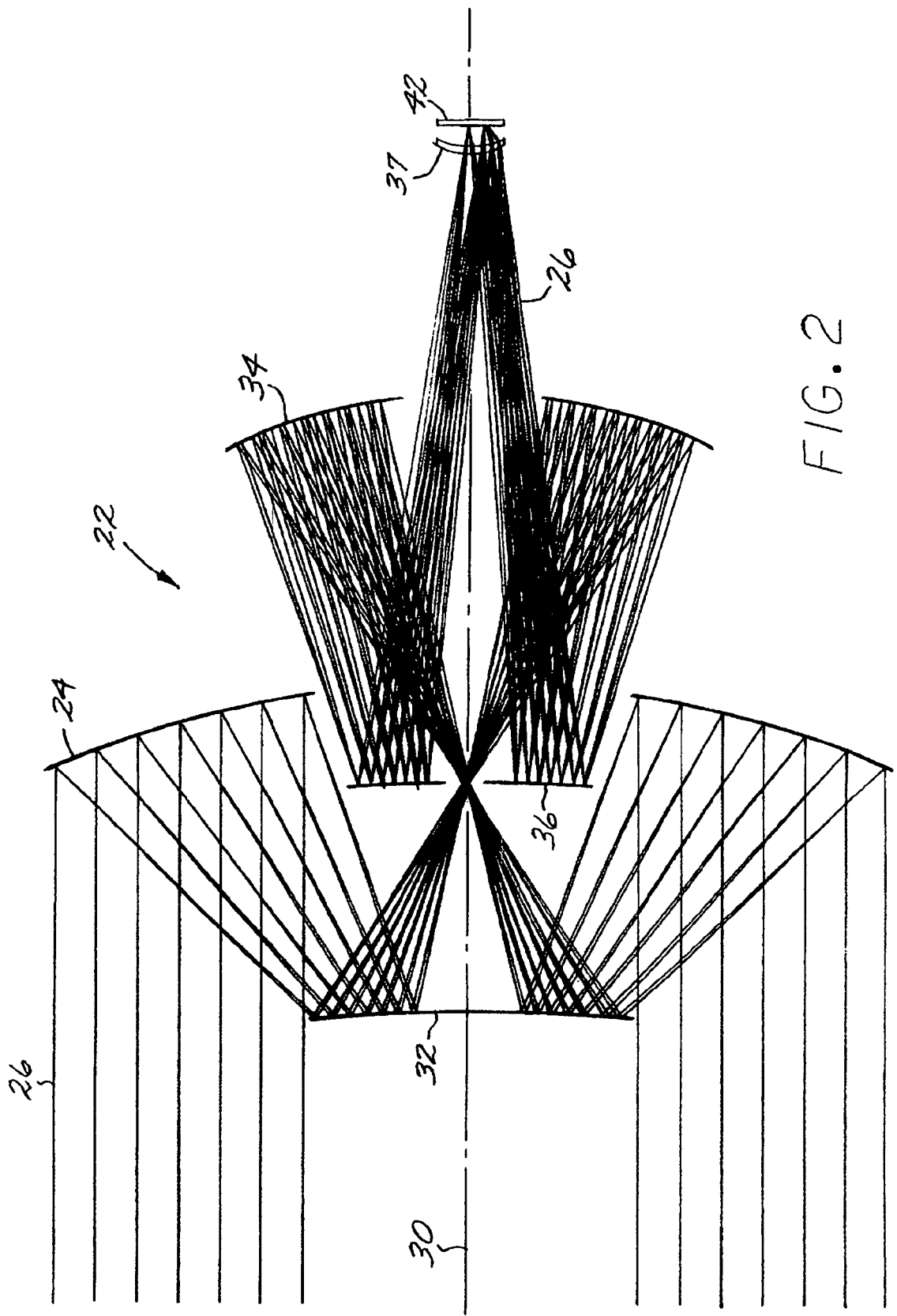
FIG. 2 is a ray path drawing for the imaging optical system of FIG. 1.

FIG. 1 depicts an imaging optical system 20 that includes a telescope 22, and FIG. 2 is a ray-path drawing of the telescope 22. The telescope 22 has a positive-optical-power primary mirror 24 that receives a light beam 26 from an external source 28 parallel to a beam axis 30. The light beam 26 may be of any operable wavelength, but is preferably an infrared light beam. A negative-optical-power secondary mirror 32 receives the light beam 26 reflected from the primary mirror 24. A positive-optical-power tertiary mirror 34 receives the light beam 26 reflected from the secondary mirror 32. A negative-optical-power quaternary mirror 36 receives the light beam 26 reflected from the tertiary mirror 34. The light beam 26 reflected from the quaternary mirror 36 passes through a positive-optical-power field lens 37. Preferably, the sum of the optical powers of the primary mirror 24, the secondary mirror 32, the tertiary mirror 34, the quaternary mirror 36, and the field lens 37 is substantially zero, producing a planar or near-planar (due to aberrations) final image.

The primary mirror 24, the secondary mirror 32, the tertiary mirror 34, the quaternary mirror 36, and the field lens 37 are axisymmetric about the beam axis 30. To permit this axial symmetry, the light beam 26 reflected from the secondary mirror 32 passes through a quaternary-mirror central opening 38 in the quaternary mirror 36 and a system stop 49, and through a primary-mirror central opening 41 in the primary mirror 24. After reflecting from the quaternary mirror 36, the light beam 26 passes through a tertiary-mirror central opening 40 in the tertiary mirror 34.

For the present approach, the four-mirror design was selected because of the intermediate field stop, which is the quaternary mirror central opening 38, and its compact configuration. A two-mirror Cassegrain configuration was rejected because of the lack of a field stop, and its inability to meet the imaging requirements. A three-mirror anastigmat was rejected because of the system length and the potential inaccessibility of the detector assembly. The field lens 37 was introduced to meet the requirements for effective focal length and back focal length, while eliminating all vignetting. The primary mirror 24 was chosen as a paraboloid to make its null test as simple as possible. To facilitate rapid testing and assembly of the optical system, the combination of the primary mirror 24 and the secondary mirror 32 may also be readily null tested. The present design has a low residual wavefront error and distortion.

A preferred form of the telescope 22 was designed using optical ray path analysis. FIG. 3 is a prescription for this preferred form of the telescope 22.

After passing through the tertiary mirror central opening 40 and through the field lens 37 and thereby leaving the telescope 22, the light beam 26 is imaged on a detector 42, preferably an infrared detector 42. Infrared detectors 42 and their construction are known in the art for other applications. The preferred infrared detector 42 is a focal plane array (FPA), which images the light beam 26 with a series of subelements that define a pixel array. Infrared focal plane arrays and their construction are also known in the art for other applications. The set of optical elements, in the form of the mirrors 24, 32, 34, and 36, and the field lens 37, together direct the light beam 26 to be incident upon the detector 42.

A cooling housing 44 encloses the detector 42 and the field lens 37. The housing 44 is cooled by a cooler 45 such as a Joule-Thomson cycle cooler. The cooling of the housing 44 also cools the enclosed detector 42 and the field lens 37. The housing 44 typically is initially at room temperature when the imaging optical system 20 is in an "inert" state. When the imaging optical system 20 is activated for service, the cooler 45 must cool the housing 44, the detector 42, and the field lens 37 quickly. There is a cooled entrance window 46 through the housing 44 and positioned so that the light beam 26 reflected from the quaternary mirror 36 can enter the interior of the detector 42 and be incident upon the field lens 37 and thence the detector 42.

The cooling housing 44 encloses the detector 42 and the field lens 37, which has a relatively small mass, but does not enclose any of the reflective elements of the telescope 22 including the primary mirror 24, the secondary mirror 32, the tertiary mirror 34, and/or the quaternary mirror 36. If the cooling housing did enclose any of these relatively large mirrors 24, 32, 34, and/or 36, the mass that would have to be cooled would be much larger than in the described embodiment, and it would take longer to cool the detector 42 for a given cooling power of the cooler 45. The present approach cools a minimum mass, so that the cooling of that mass, including only the detector 42, the field lens 37, and the housing 44, is rapid.

The field of view of the detector 42 is such that light, termed stray light, other than the light beam 26 from the external source 28 can reach the detector 42 through the entrance window 46, absent the warm-stop structure to be described next. The stray light serves as a background noise to the signal of the light beam 26 of interest from the external source 28, reducing the signal-to-noise ratio and thence the contrast of the output signal of the detector 42.

To reduce the adverse effects of stray light, there is an uncooled warm-stop structure 48 positioned outside of the cooling housing 44 but in the field of view of the detector 42. The illustrated warm-stop structure 48 extends between the tertiary mirror 34 and the quaternary mirror 36 in a generally converging frustoconical external form (i.e., a frustum of a cone). The internal form of the warm-stop structure 48 is also frustoconical, but with the reflective facets described subsequently. This frustoconical form of the warm-stop structure 48 was necessary because of the size and placement of the mirrors 24, 34, and 36, and the openings through the mirrors 24, 34, and 36. As may be seen from FIG. 2, a cylindrical form of warm-stop structure extending between the ternary mirror 34 and the quaternary mirror 36 would not have been operable, as it would have either obscured a portion of the ternary mirror 34 or not have fit through the required size of the primary-mirror central opening 41, depending upon the cylindrical diameter selected. The selection of a frustoconical external and internal form for the warm-stop structure 48, necessitated by the form of the telescope 22, required innovations in the design of the warm-stop structure 48 as will be discussed subsequently.

Figure 4:
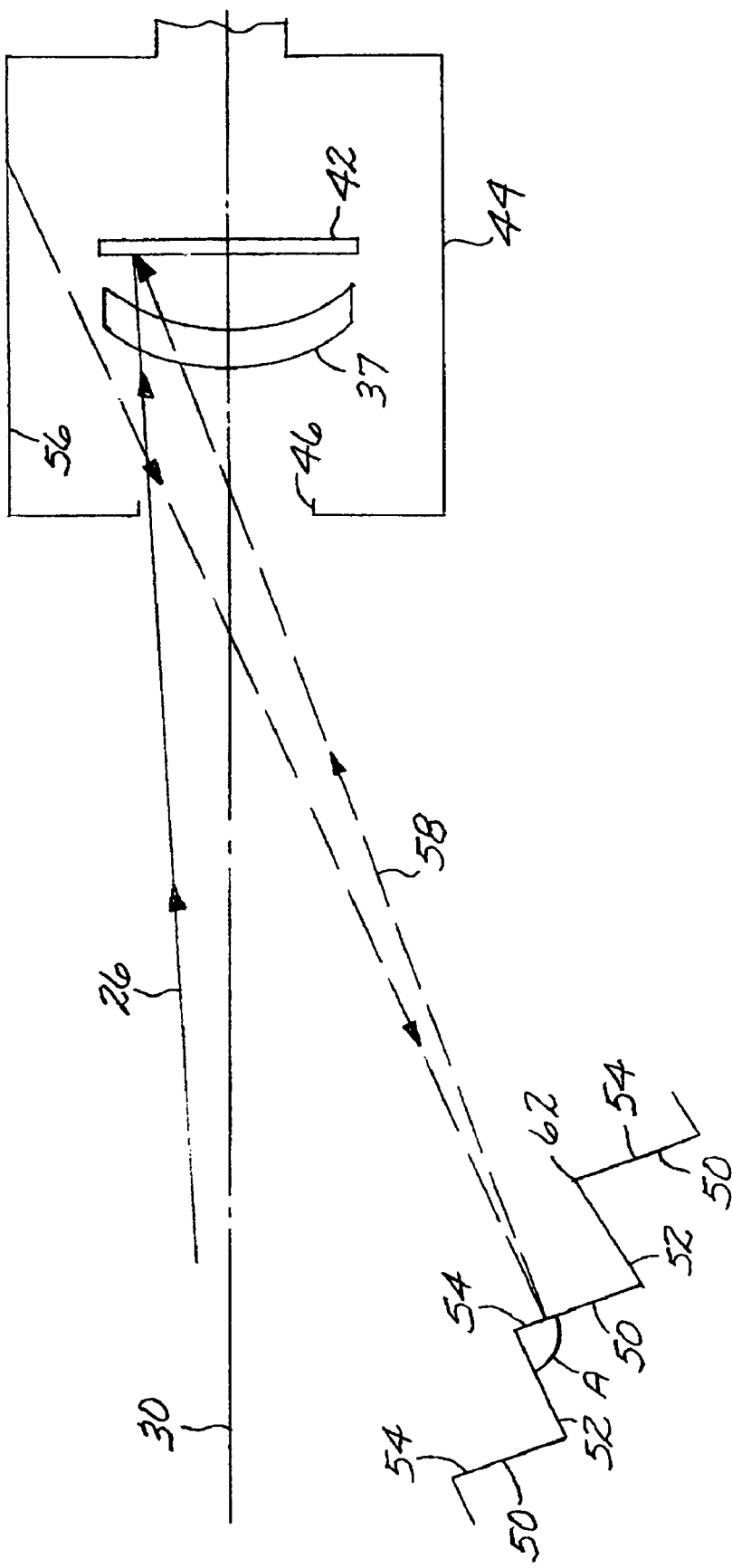
FIG. 4 is a detail of FIG. 1, illustrating the warm-stop structure.

FIG. 4 illustrates the warm-stop structure 48 and its function in greater detail. The internal surface of the warm-stop structure 48 is not a smoothly continuous surface, but instead comprises an alternating plurality of facets 50 separated by connecting surfaces 52. The facets 50 and the connecting surfaces 52 are axisymmetric about the beam axis 30, and the external and internal generally frustoconical form of the warm-stop structure 48 converges with increasing distance from the tertiary mirror 34 toward the quaternary mirror 36. An interior angle A between each facet 50 and respective surface 52 is selected such that the surface 52 is not visible from the detector 42. The interior angle A is not necessarily constant for each corner between facets 50 and surfaces 52. Each acute-angle corner 60 between the facet 50 and the surface 52 is also not visible from the detector 42 due to this orientation of the surface 52, so that its infrared emissions are not visible. Each obtuse-angle corner 62 between the facet 50 and its respective surface 52 is radiused with a small finite radius to reduce its infrared emissions. This small radius, which is preferably less than about 10 micrometers radius, is achieved by machining the facets 50 and the surfaces 52 by highly precise diamond point turning. The obtuse-angle corners 62 serve as infrared sources, and the small radius minimizes the apparent size of these sources.

Each of the facets 50 has a reflective surface 54 oriented to reflect a view of an interior 56 of the cooling housing 44 back to the interior 56 of the cooling housing 44. The reflective surfaces 54 are preferably flat. As a result of this design, a stray light beam 58 that reaches the detector 42 through the entrance window 46 from one of the facets 50 necessarily is a reflection of the interior 56 of the cooling housing 44. The interior 56 is cooled in service, so that the infrared intensity of the stray light beam 58 is small. The result is that, at any point on the active surface of the detector 42, the intensity of the stray light beam 58 that forms the background is small, so that the intensity of the light beam 26 is relatively large. Stated alternatively, the ratio of the intensities of the signal (light beam 26)-to-noise (stray light beam 58) is large, so that the detector 42 functions efficiently in presenting the signal for analysis. The connecting surfaces 52 are oriented so that they are not visible to the detector 42, by cutting them back slightly from the line of view to the detector 42. The acute-angle corner 60 is also not visible as a result. Accordingly, there is no stray light reflected to the detector 42 from the connecting surfaces 52 or from the acute-angle corners 60. A small amount of stray light reflects from the obtuse-angle corners 62, but that stray light is kept small by making the physical size of the obtuse-angle corner 62 small.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An imaging optical system comprising:
    a positive-optical-power primary mirror that receives a light beam from an external source parallel to a beam axis;
    a negative-optical-power secondary mirror that receives the light beam reflected from the primary mirror;
    a positive-optical-power tertiary mirror that receives the light beam reflected from the secondary mirror;
    a negative-optical-power quaternary mirror that receives the light beam reflected from the tertiary mirror, and
    a positive-optical-power field lens that receives the light beam reflected from the quaternary mirror,
    wherein the light beam reflected from the secondary mirror passes through a quaternary-mirror central opening in the quaternary mirror and through a primary-mirror central opening in the primary mirror, and wherein the light beam reflected from the quaternary mirror passes through a tertiary-mirror central opening in the tertiary mirror.

2. The imaging optical system of claim 1, wherein the primary mirror, the secondary mirror, the tertiary mirror, the quaternary mirror, and the field lens are axisymmetric about the beam axis.

3. The imaging optical system of claim 1, wherein the sum of the optical powers of the primary mirror, the secondary mirror, the tertiary mirror, the quaternary mirror, and the field lens is substantially zero.

4. The imaging optical system of claim 1, further including a detector upon which the light beam is incident after the light beam passes through the field lens.

5. The imaging optical system of claim 1, further including an infrared detector upon which the light beam is incident after the light beam passes through the field lens.

6. The imaging optical system of claim 1, further including
    an infrared detector upon which the light beam is incident after the light beam passes through the field lens, and
    a cooling housing enclosing the detector and the field lens, but not enclosing any of the primary mirror, the secondary mirror, the tertiary mirror, and the quaternary mirror.

7. The imaging optical system of claim 1, further including
    an infrared detector upon which the light beam is incident after the light beam passes through the field lens,
    a cooling housing enclosing the detector and the field lens, but not enclosing any of the primary mirror, the secondary mirror, the tertiary mirror, and the quaternary mirror, wherein the cooling housing has a cooled aperture stop therein, and
    an uncooled warm-stop structure outside of the cooling housing but in a field of view of the detector.

8. The imaging optical system of claim 1, further including
    an infrared detector upon which the light beam is incident after the light beam passes through the field lens,
    a cooling housing enclosing the detector and the field lens, but not enclosing any of the primary mirror, the secondary mirror, the tertiary mirror, and the quaternary mirror, wherein the cooling housing has a cooled aperture stop therein and
    an uncooled warm-stop structure outside of the cooling housing but in a field of view of the detector, wherein the warm-stop structure comprises a plurality of facets with reflective surfaces oriented to reflect a view of an interior of the cooling housing back to the interior of the cooling housing.

9. The imaging optical system of claim 1, further including
an infrared detector upon which the light beam is incident after the light beam passes through the field lens,
a cooling housing enclosing the detector and the field lens, but not enclosing any of the primary mirror, the secondary mirror, the tertiary mirror, and the quaternary mirror, wherein the cooling housing has a cooled aperture stop therein, and
an uncooled warm-stop structure outside of the cooling housing but in a field of view of the detector, wherein the warm-stop structure has an internal frustoconical form extending between the tertiary mirror and the quaternary mirror, wherein the warm-stop structure comprises a plurality of facets with reflective surfaces oriented to reflect a view of an interior of the cooling housing back to the interior of the cooling housing, and wherein connecting surfaces extending between the facets and acute-angle corners between the connecting surfaces and the respective facets are not visible to the detector.

10. An imaging optical system comprising:
a positive-optical-power primary mirror that receives a light beam from an external source parallel to a beam axis;
a negative-optical-power secondary mirror that receives the light beam reflected from the primary mirror;
a positive-optical-power tertiary mirror that receives the light beam reflected from the secondary mirror;
a negative-optical-power quaternary mirror that receives the light beam reflected from the tertiary mirror;
a positive-optical-power field lens that receives the light beam reflected from the quaternary mirror,
wherein the light beam reflected from the secondary mirror passes through a quaternary-mirror central opening in the quaternary mirror and through a primary-mirror central opening in the primary mirror, wherein the light beam reflected from the quaternary mirror passes through a tertiary-mirror central opening in the tertiary mirror, and wherein the primary mirror, the secondary mirror, the tertiary mirror, the quaternary mirror, and the field lens are axisymmetric about the beam axis;
an infrared detector upon which the light beam is incident after the light beam passes through the field lens;
a cooling housing enclosing the detector and the field lens, but not enclosing any of the primary mirror, the secondary mirror, the tertiary mirror, and the quaternary mirror, wherein the cooling housing has a cooled aperture stop therein; and
an uncooled warm-stop structure outside of the cooling housing but in a field of view of the detector, wherein the warm-stop structure has an internal frustoconical form extending between the tertiary mirror and the quaternary mirror, and wherein the warm-stop structure comprises a plurality of facets with reflective surfaces oriented to reflect a view of an interior of the cooling housing back to the interior of the cooling housing.

11. The imaging optical system of claim 10, wherein the sum of the optical powers of the primary mirror, the secondary mirror, the tertiary mirror, the quaternary mirror, and the field lens is substantially zero.

12. An imaging optical system comprising:
an infrared detector upon which a light beam is incident,
a set of optical elements that together direct the light beam to be incident upon the infrared detector;
a cooling housing enclosing the detector; and
an uncooled warm-stop structure outside of the cooling housing but in a field of view of the detector, wherein the warm-stop structure has an internal frustoconical form, wherein the warm-stop structure comprises a plurality of faces with reflective surfaces oriented to reflect a view of an interior of the cooling housing back to the interior of the cooling housing, and wherein connecting surfaces extending between the facets and acute-angle corners between the connecting surfaces and the respective facets are not visible to the detector,
wherein the set of optical elements comprises a positive-optical-power primary mirror that receives the light beam from an external source parallel to a beam axis,
a negative-optical-power secondary mirror that receives the light beam reflected from the primary mirror,
a positive-optical-power tertiary mirror that receives the light beam reflected from the secondary mirror,
a negative-optical-power quaternary mirror that receives the light beam reflected from the tertiary mirror, and
a positive-optical-power field lens that receives the light beam reflected from the quaternary mirror,
wherein the light beam reflected from the secondary mirror passes through a quaternary-mirror central opening in the quaternary mirror and through a primary-mirror central opening in the primary mirror, wherein the light beam reflected from the quaternary mirror passes through a tertiary-mirror central opening in the tertiary mirror, and wherein the primary mirror, the secondary mirror, the tertiary mirror, the quaternary mirror and the field lens are axisymmetric about the beam axis.

* * * * *